(12) United States Patent
Jerrard-Dunne et al.

(10) Patent No.: US 10,248,551 B2
(45) Date of Patent: *Apr. 2, 2019

(54) SELECTIVE OBJECT TESTING IN A CLIENT-SERVER ENVIRONMENT

(71) Applicant: International Business Machines Corporation, Armonk, NY (US)

(72) Inventors: Stanley K. Jerrard-Dunne, Dublin (IE); Alice-Maria Marascu, Dublin (IE); Conor D. McGrath, Dublin (IE); Andrew Penrose, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/030,090

(22) Filed: Jul. 9, 2018

(65) Prior Publication Data
US 2018/0314620 A1 Nov. 1, 2018

Related U.S. Application Data

(63) Continuation of application No. 14/086,026, filed on Nov. 21, 2013, now Pat. No. 10,042,742.

(51) Int. Cl.
*G06F 11/36* (2006.01)
(52) U.S. Cl.
CPC .................. *G06F 11/368* (2013.01)
(58) Field of Classification Search
CPC .................................................. G06F 11/368
See application file for complete search history.

(56) References Cited

U.S. PATENT DOCUMENTS

| 5,178,546 | A  |   | 1/1993  | Dickerson           |
|-----------|----|---|---------|---------------------|
| 6,393,437 | B1 | * | 5/2002  | Zinda ......... G06F 8/20 200/203 |
| 7,310,798 | B1 |   | 12/2007 | Gunara et al.       |
| 7,322,025 | B2 | * | 1/2008  | Reddy .......... G06F 8/71 717/105 |

(Continued)

OTHER PUBLICATIONS

Assogba et al., "Share: A Programming Environment for Loosely Bound Cooperation", CHI 2010: Sharing Content and Searches, Apr. 10-15, 2010, Atlanta, GA, USA, Copyright 2010 ACM, pp. 961-970.

(Continued)

*Primary Examiner* — Chat C Do
*Assistant Examiner* — Douglas M Slachta
(74) *Attorney, Agent, or Firm* — Alexander G. Jochym (57) ABSTRACT

A tool for testing objects in a client-server environment. The tool receives a plurality of proposed modifications to a baseline set of objects stored in a repository collectively submitted by a plurality of members of a first group of users and a plurality of members of a second group of users. The tool registers each modification of the plurality of proposed modifications with a user identifier corresponding to the user proposing the modification. The tool receives instructions to test the baseline set of objects with modifications that correspond to the first group of users. The tool determines which of the baseline set of objects stored in the repository are subject to the modifications that correspond to the first group of users. The tool executes the baseline set of objects and incorporating the modifications that correspond to the first group of users.

18 Claims, 5 Drawing Sheets

(56) References Cited

U.S. PATENT DOCUMENTS

| | | | |
|---|---|---|---|
| 7,480,895 B2* | 1/2009 | Brauneis | G06F 8/60 709/201 |
| 7,480,896 B2* | 1/2009 | Harry | G06F 8/71 717/120 |
| 7,577,939 B2 | 8/2009 | Bayardo, Jr. et al. | |
| 8,204,908 B2 | 6/2012 | Misch et al. | |
| 8,245,192 B1* | 8/2012 | Chen | G06F 8/71 717/103 |
| 8,393,437 B2 | 3/2013 | Longoni et al. | |
| 8,407,670 B2* | 3/2013 | Hegde | G06F 8/71 717/122 |
| 8,539,282 B1 | 9/2013 | Kabanov et al. | |
| 8,713,554 B1 | 4/2014 | Chopra et al. | |
| 9,058,576 B2* | 6/2015 | Attar | G06Q 10/06 |
| 2002/0040469 A1 | 4/2002 | Pramberger | |
| 2003/0084424 A1 | 5/2003 | Reddy et al. | |
| 2003/0115570 A1 | 6/2003 | Bisceglia | |
| 2003/0135841 A1 | 7/2003 | Ambrose et al. | |
| 2003/0182652 A1* | 9/2003 | Custodio | G06F 8/61 717/122 |
| 2003/0192039 A1* | 10/2003 | McConnell | G06F 9/44505 717/171 |
| 2004/0003371 A1* | 1/2004 | Coulthard | G06F 8/24 717/101 |
| 2005/0114475 A1 | 5/2005 | Chang | |
| 2005/0114829 A1* | 5/2005 | Robin | G06Q 10/06 717/101 |
| 2006/0218521 A1 | 9/2006 | Hagstrom et al. | |
| 2008/0133616 A1 | 6/2008 | Willoughby | |
| 2008/0256517 A1 | 10/2008 | Atkin et al. | |
| 2009/0300423 A1 | 12/2009 | Ferris | |
| 2010/0095268 A1 | 4/2010 | Lowry et al. | |
| 2011/0083122 A1 | 4/2011 | Chen et al. | |
| 2011/0125798 A1* | 5/2011 | Misch | G06F 8/71 707/785 |
| 2011/0161931 A1 | 6/2011 | Camelon et al. | |
| 2011/0307862 A1 | 12/2011 | Abrams et al. | |
| 2012/0047139 A1 | 2/2012 | Fitzer et al. | |
| 2012/0060143 A1 | 3/2012 | Nigul | |
| 2012/0298421 A1 | 11/2012 | Coates et al. | |
| 2013/0007709 A1* | 1/2013 | Fan | G06F 8/71 717/121 |
| 2013/0036400 A1 | 2/2013 | Bak et al. | |
| 2013/0174124 A1 | 7/2013 | Watters et al. | |
| 2013/0305214 A1 | 11/2013 | Martineau | |
| 2014/0053127 A1 | 2/2014 | Madison et al. | |

OTHER PUBLICATIONS

Fan et al., "Achieving Integrated Consistency Maintenance and Awareness in Real-Time Collaborative Programming Environments: The CoEclipse Approach", Proceedings of the 2012 IEEE 16th International Conference on Computer Supported Cooperative Work in Design, © 2012 IEEE, pp. 94-101.

Fan et al., "Supporting Semantic Conflict Prevention in Real-Time Collaborative Programming Environments", based on an earlier work: SAC '12 Proceedings of the 2012 ACM Symposium on Applied Computing, Copyright 2012 ACM 978-1-4503-0857-1/12/03, Applied Computing Review vol. 12, No. 2, pp. 39-52, <http://doi.acm.org/10.1145/2245276.2245417>.

Gärtner et al., "IdDE: A collaborative environment for distributed programming in pairs", 978-1-4673-0793-2/12, © 2012 IEEE, Informatica (CLEI), 2012 XXXVIII Conferencia Latinoamericana En, pp. 1-10, Conference Oct. 1-5, 2012, doi 10.1109/CLEI.2012.6427209.

Goldman, "Software Development with Real-Time Collaborative Editing", submitted to the Department of Electrical Engineering and Computer Science in partial fulfillment of the requirements for the degree of Doctor of Philosophy at the Massachusetts Institute of Technology, Sep. 2012, © Massachusetts Institute of Technology 2012.

Hegde et al., "Connecting Programming Environments to Support Ad-Hoc Collaboration", 23rd IEEE/ACM International Conference on Automated Software Engineering, 2008. ASE 2008, Sep. 15-19, 2008, pp. 178-187.

"Self-Service platform Cloud | Application Development and Testing, Software Demos, Virtual Training, SharePoint | CloudShare", provided in the disclosure by the inventor on May 15, 2013, <http://www.cloudshare.com/>.

"A method and apparatus for merging source code by Instance Message", An IP.com Prior Art Database Technical Disclosure, Authors et. al.: Disclosed Anonymously, IP.com No. IPCOM000197580D, IP.com Electronic Publication: Jul. 15, 2010, pp. 1-3.

"ProgBuddy: Shared development environment in your browser", provided in the disclosure by the inventor on May 15, 2013, <https://progbuddy.com/>.

"Arguments against a shared development environment—Stack Overflow", provided in the disclosure by the inventor on May 15, 2013, <http://stackoverflow.com/questions/2063307/arguments-against-a-shared-development-environment>.

"Version control workflow for environment with shared code—Programmers Stack Exchange", asked Dec. 28, 2011, <http://programmers.stackexchange.com/questions/127446/version-control-workflow-for-environment-with-shared-code>.

List of IBM Patents or Patent Applications Treated as Related, Appendix P, Filed Herewith, 2 pages.

Jerrard-Dunne, et al., "Selective Object Testing in a Client-Server Environment", U.S. Appl. No. 14/086,026, filed Nov. 21, 2013.

Ueli Wahli et al., Software Configuration Management a Clear Case for IBM Rational ClearCase and ClearQuest UCM, Dec. 2004, IBM, First Edition.

Serganch, Incremental testing with TeamCity, Mar. 13, 2012.

Walt Stoneburner, Software Configuration and Management and Version Control a User's Guide to Learning Version Control Practices, Mar. 31, 2010.

Martin Fowler, Continuous Integration, May 1, 2006.

Mats Gothe et al., Collaborative Application Lifecycle Management with IBM Rational Products, Dec. 2008, IBM, First Edition.

Steve Berczuk et al., Agile SCM—Build Management for an Agile Team, Oct. 2003, Crossroads News.

Using Siebel Tools, Sep. 2004, Siebel Systems, Inc. Version 7.7.

AWS Elastic Beanstalk Developers Guide, Dec. 1, 2010, API Version.

* cited by examiner

SELECTIVE OBJECT TESTING IN A CLIENT-SERVER ENVIRONMENT

BACKGROUND OF THE INVENTION

The present invention relates generally to the field of software development, and more particularly to testing objects in a client-server environment.

The development and updating of software programs typically involves multiple iterations of a number of sections of code. As a program develops and undergoes changes, several developers often modify sections of code multiple times. A program called the source control system maintains a repository, where the most current versions of the program are stored. A developer may "check out" a copy, called a working copy, and make alterations to the code. The developer must then merge the working copy with the repository copy in order to update the software. Additionally, multiple developers often work on the same file at the same time. This leads to multiple versions of a given file, each with different changes which may be incompatible with other developers' changes. In this case, developers must merge the multiple versions and test for bugs.

As the software changes, the developers must ensure that their modifications to the program have not resulted in the introduction of new software bugs, called regressions, to previously functioning software. Because of the high demands of consumers, minimizing regressions through multiple iterations of a software program is a crucial and expensive part of software development. Development and testing of complex software requires that detailed environment configurations be in place to deliver new candidate code. Often these environments consist of multiple machines that are costly and complex to setup and maintain.

SUMMARY

Embodiments of the present invention disclose a method, computer program product, and system for testing objects in a client-server environment. The method includes receiving, by one or more computer processors, a plurality of proposed modifications to a baseline set of objects stored in a repository collectively submitted by a plurality of members of a first group of users and a plurality of members of a second group of users. The method includes registering, by one or more computer processors, each modification of the plurality of proposed modifications with a user identifier corresponding to the user proposing the modification. The method includes receiving, by one or more computer processors, instructions to test the baseline set of objects with modifications that correspond to the first group of users, wherein receiving includes determining whether any of the users in the first group of users previously registered at least one of the plurality of proposed user modifications to the baseline set of objects by inspecting a unique folder associated with each user in the first group of users to determine whether any users previously submitted the proposed user modifications. The method includes determining, by one or more computer processors, which of the baseline set of objects stored in the repository are subject to the modifications that correspond to the first group of users. The method includes executing, by one or more computer processors, the baseline set of objects and incorporating the modifications that correspond to the first group of users without incorporating modifications that correspond to the second group of users and without committing the plurality of proposed modifications to the baseline set of objects stored in the repository.

DETAILED DESCRIPTION

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by, or in connection with, an instruction execution system, apparatus, or device. Computer readable storage media comprise all computer readable media, with the sole exception being a transitory, propagating signal.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
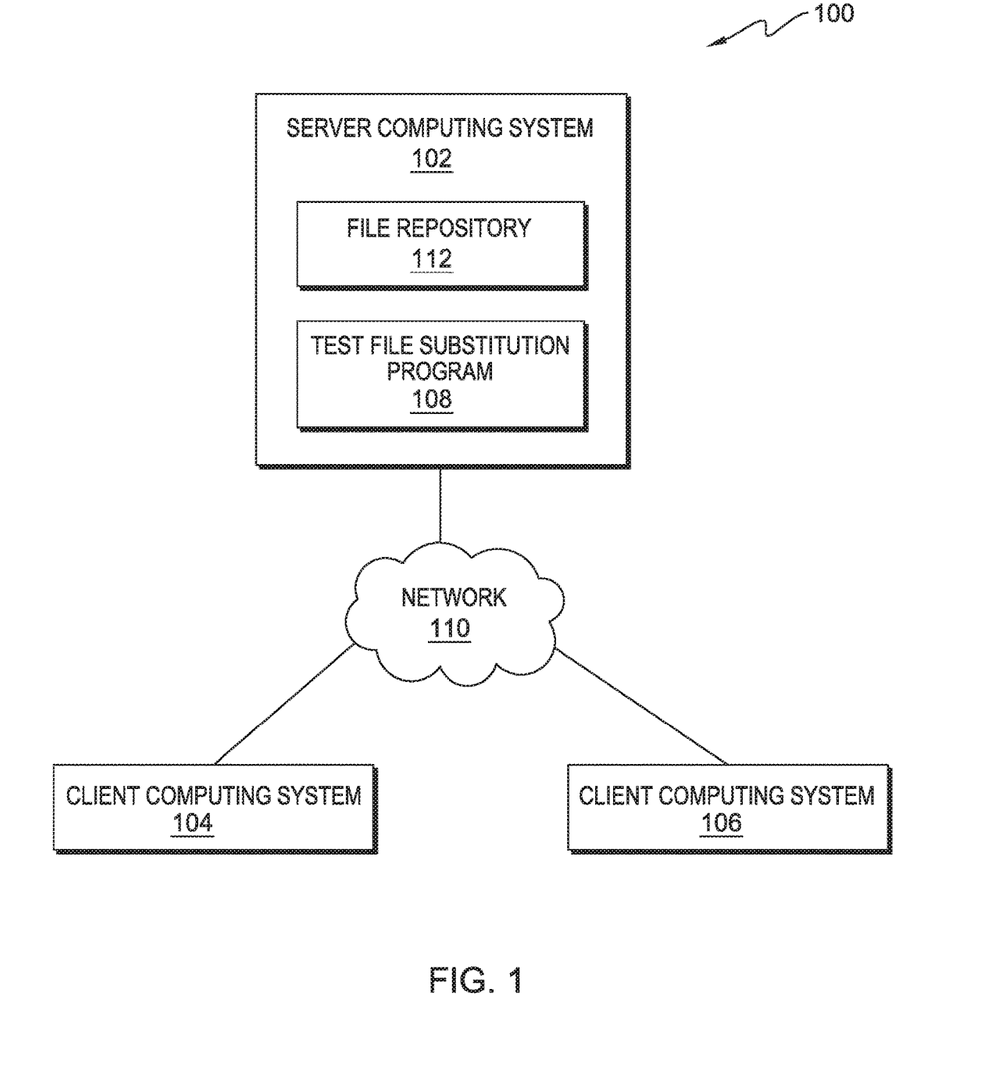
FIG. 1 is a functional block diagram illustrating a client-server environment, in accordance with an embodiment of the present invention.

The present invention will now be described in detail with reference to the Figures. FIG. 1 is a functional block diagram illustrating a client-server environment, generally designated 100, in accordance with an embodiment of the present invention. Client-server environment 100 includes at least one server computing system, such as server computing system 102, and at least one client computing system, such as client computing systems 104 and 106, all connected via network 110.

Server computing system 102 may be a specialized computer server, a desktop computer, a laptop computer, a tablet computer, a netbook computer, a personal computer (PC), or any other computer system known in the art. In certain embodiments, server computing system 102 represents a computer system utilizing clustered computers and components that act as a single pool of seamless resources when accessed through network 110, as is common in data centers with cloud computing applications. In general, server computing system 102 is representative of any programmable electronic device or combination of programmable electronic devices capable of reading machine readable program instructions and communicating with other computing devices via network 110. Exemplary components of server computing system 102 and client computing systems 104 and 106 are described in greater detail with regard to FIG. 5.

In various embodiments of the present invention, client computing systems 104 and 106 can each respectively be a laptop computer, a tablet computer, a netbook computer, a personal computer (PC), a desktop computer, a personal digital assistant (PDA), a smartphone, or a programmable electronic device capable of communicating with server computing system 102 via network 110.

In this illustrative embodiment, test file substitution program 108 and file repository 112 are stored on server computing system 102. However, in other embodiments, test file substitution program 108 and file repository 112 may be stored externally and accessed through a communication network, such as network 110. Network 110 can be, for example, a local area network (LAN), a wide area network (WAN) such as the Internet, or a combination of the two, and may include wired, wireless, fiber optic or any other connection known in the art. In general, network 110 can be any combination of connections and protocols that will support communications between server computing system 102 and client computing systems 104 and 106.

In general, network 110 can be any combination of connections and protocols that will support communications between server computing system 102 and client computing systems 104 and 106. Network 110 can include, for example, a local area network (LAN), a wide area network (WAN) such as Internet, a cellular network, or any combination of the preceding, and can further include wired, wireless, and/or fiber optic connections.

In one embodiment, server computing system 102 includes file repository 112 and test file substitution program 108. File repository 112 is a data structure that includes objects and historical information about the objects included therein. Objects stored on file repository 112 include a set of current files and directories, a historical record of changes to the objects, and sets of committed objects. In one embodiment, file repository 112 includes a baseline, which includes, for example, a significant set of files for executing particular functionality in a computer program. Baselines typically include versions of software that receive some form of formal approval and have undergone substantial quality control. Alternatively, baselines can be developmental baselines, which include the current state of work product in the midst of development. In another embodiment, the baseline includes a set of server modules. Server modules are components that make up the overall server environment, such as server computing system 102. Server modules include, for example, application server nodes and databases (or subsets thereof).

Users operating client computing systems 104 and 106 can update a baseline by committing, or "checking in," files that add, change or delete files in file repository 112. Test file substitution program 108 enables individual users, or groups thereof, to upload proposed user modifications to the server and to associate those proposed user modifications with the user or group in order to execute the repository baseline with the user's changes but without the significant step of committing changes to repository 112 or updating a baseline, which may result in breaking other functionalities of the baseline.

Figure 2:
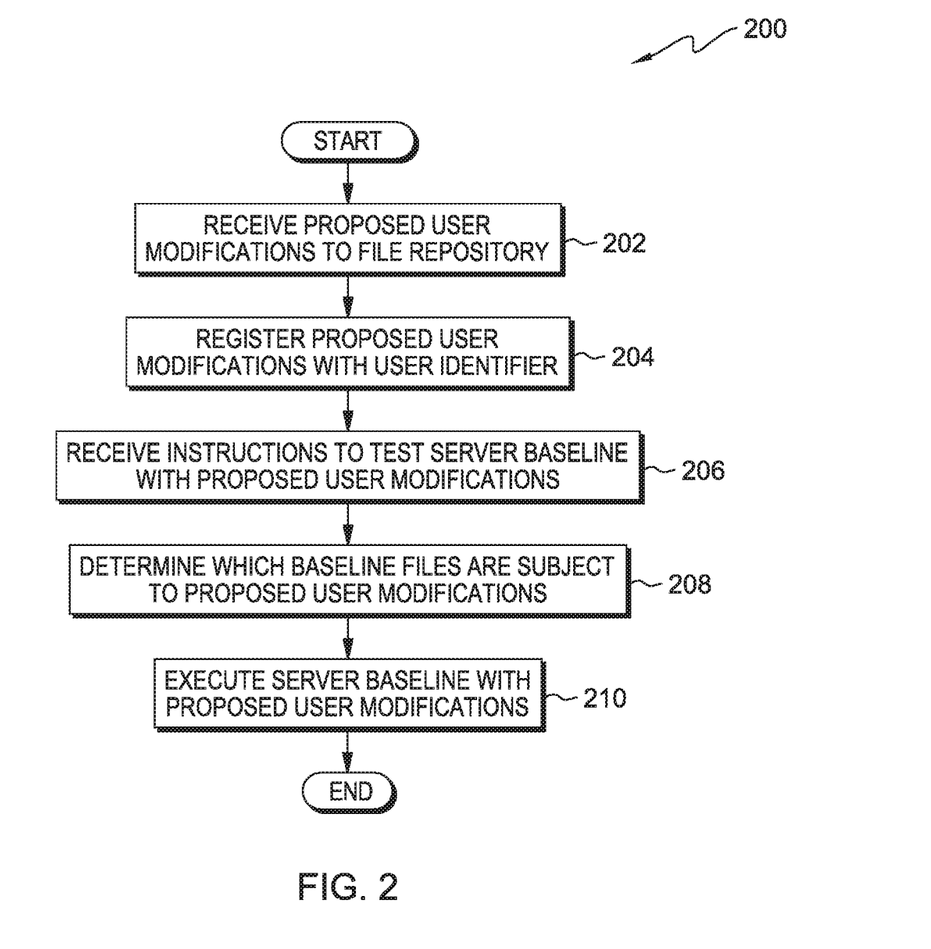
FIG. 2 is a flowchart depicting operational steps of a test-file substitution program, in accordance with an embodiment of the present invention.

FIG. 2 is a flowchart depicting operational steps of a test file substitution program, generally designated 200, in accordance with an embodiment of the present invention.

Server computing system 102 receives proposed user modifications to file repository 112 (step 202). The proposed user modifications include potential changes to the files stored on server computing system 102 in file repository 112. This step enables the client computing system to interact with client-server computing environment 100 without checking in the proposed user modifications, which would result in changing the files stored on server computing system 112 for all client computing systems that access it. In one embodiment, receiving the proposed user modifications includes server computing system 102 storing the proposed user modifications in a directory or registry on server computing system 102 that is separate from file repository 112.

Server computing system 102 registers the received proposed user modifications with a unique user identifier (step 204). Registration includes identifying the user by any unique identifier associated with the user, e.g., cookies, hypertext transfer protocol (http) headers, or server session login information. Server computing system 102 associates the proposed user modifications with the user, using the client identifier by, for example, creating a folder in a directory or registry separate from file repository 112 and storing the proposed user modifications in that folder.

Server computing system 102 receives instructions to test the baseline in file repository 112 with the proposed user modifications (step 206). In one embodiment, client computing system 104 sends a request to server computing system 102 via network 110 to test a previously established baseline stored in file repository 112 with the proposed user modifications, without committing the proposed modifications to file repository 112.

Server computing system 102 determines which baseline files stored in file repository 112 are subject to proposed user modifications (step 208). Server computing system 102 completes this determination by, for example, determining the unique identifier associated with client computing system 104 and accessing the directory folder in which server computing system 102 previously stored the proposed user modifications submitted by the same user. Proposed user modifications may, for example, propose to add a new file to the set of files contained in the baseline, modify a file that already exists in the baseline, and/or delete a file that presently exists in the baseline.

Server computing system 102 executes the baseline with the proposed user modifications (step 210). In one embodiment, a proposed user modification involves a change to a file as it exists in the file repository. When server computing system 102 executes the baseline subject to proposed user modifications, rather than using the file as it exists in file repository 112, server computing system 102 uses the file as it exists in the user modified file. In another embodiment, server computing system 102 accesses the user modified file only if the user who submitted the modified file requests that server computing system 102 execute the baseline. In this embodiment, other users who concurrently access server computing system 102 to execute the baseline will not encounter errors that the proposed user modifications create.

In another embodiment, the proposed user modifications include a change to an existing file in the baseline, where that change references a file not included in the baseline, but is a new file that the user submits (i.e., the user proposes to add a new file). In this embodiment, when server computing system 102 executes the baseline with the proposed user modifications, server computing system 102 accesses the changed file from the folder associated with the user. Subsequently, when the changed file references the new file, server computing system 102 accesses the new file submitted by the user in the proposed user modifications.

Figure 3:
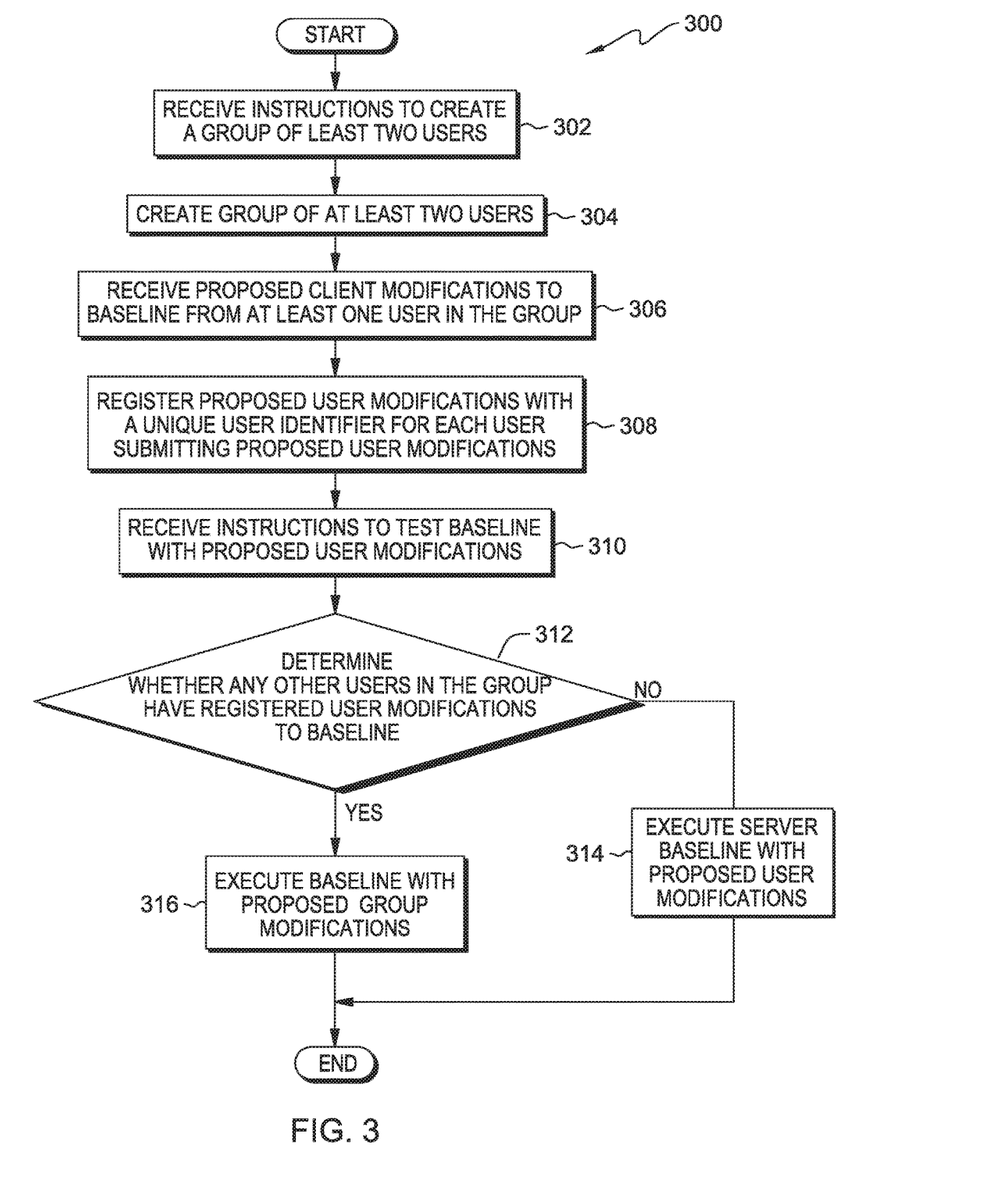
FIG. 3 is a flowchart depicting operational steps of a test-file substitution program for use in a client-server environment with multiple client computing systems, in accordance with an embodiment of the present invention.

FIG. 3 is a flowchart depicting operational steps of a test file substitution program, generally designated 300, for use in a client-server environment with multiple client computing systems, in accordance with an embodiment of the present invention.

Server computing system 102 receives instructions to create a group of at least two users (step 302). In one embodiment, client-server environment 100 includes two or more client computing systems, such as client computing systems 104 and 106. In an example of such an embodiment, client computing systems 104 and 106 correspond to users who work closely on proposed user modifications and, therefore, it is desirous that client computing system 106 has the ability to view and test the proposed user modifications submitted by client computing system 104, and vice versa.

Server computing system 102 creates a group of at least two users (step 304). In one embodiment, server computing system 102 groups client computing systems 104 and 106. Server computing system 102 creates a group by, for example, associating the unique user identifier for each client computing system so that when one member of the group requests a test of the baseline with user modifications, server computing system 102 accesses the folders storing proposed user modifications for all users in the group, while excluding those users who are not members of the group.

Server computing system 102 receives proposed user modifications to the baseline from at least one user in the group (step 306). As discussed above, the proposed user modifications include potential changes to the files stored on server computing system 102 in file repository 112. This step enables the user to interact with the server computing environment, which may consist of a large number of separate physical servers, without checking in the proposed user modifications, which would result in changing the baseline stored on server computing system 112 for all users who access it. In one embodiment, receiving the proposed user modifications includes the server computing system 102 storing the proposed user modifications in a directory or registry on server computing system 102 that is separate from file repository 112.

Server computing system 102 registers the proposed user modifications with a unique user identifier for each user submitting proposed user modifications (step 308). As discussed above, registration includes identifying the user by any unique identifier associated with the user, e.g., cookies, http headers, or server login information. Server computing system 102 associates the proposed user modifications with the user using the user identifier by, for example, creating a folder in a directory or registry separate from file repository 112 and storing the proposed user modifications in that folder.

Server computing system 102 receives instructions to test the baseline with the proposed user modifications (step 310). In an illustrative embodiment, client computing systems 104 and 106 constitute a group. Client computing system 104 and client computing system 106 independently submit proposed user modifications to server computing system 102. Client computing system 104 requests that server computing system 102 executes the baseline stored in file repository 112 with the proposed user modifications submitted by all users in the group.

Server computing environment 102 determines whether any of the other users in the group previously registered proposed user modifications to the baseline stored on server computing system 102 (decision block 312). In one embodiment, server computing system 102 makes this determination by inspecting the unique folder associated with each user in the group to determine whether that user previously submitted any proposed user modifications. If server computing system 102 determines that no other user in the group previously submitted proposed user modifications (decision block 312, no branch), server computing environment 102 executes the baseline with the proposed user modifications (step 314). In the course of executing the server baseline, when test file substitution program 108 reaches a file proposed to be added, deleted, or modified by the user's proposed user modifications, test file substitution program 108 executes the file as modified in the proposed user modifications. If server computing system 102 determines that one or more other users in the group previously submitted proposed user modifications (decision block 312, yes branch), then server computing environment 102 executes the baseline with all of the proposed modifications made by group members (step 316). In the course of executing the server baseline, when test file substitution program 108 reaches a file proposed to be added, deleted, or modified by a group member's proposed user modifications, test file substitution program 108 executes the file as modified in the proposed user modifications.

In one embodiment, client computing systems 104 and 106, which constitute a group, submit conflicting proposed user modifications. In this embodiment, test file substitution program 108 includes instructions directing client server computing system 102 to favor the files of one user over another. For example, client computing system 104 submits a proposed user modification to a file. Client computing system 106 also submits a proposed user modification to the file. If client computing system 104 requests a test of the baseline with the proposed group modifications, server computing system 102 has two potential files to choose from when it executes the baseline. In one embodiment, test file substitution program 108 instructs server computing environment 102 to execute the version of the file submitted by the user who requested the test. In another embodiment, the user requesting the test of the baseline selects which proposed user modifications to use. In another embodiment, test file substitution program 108 instructs server computing system 102 to execute which ever proposed user modification to the file was submitted later in time. In another embodiment, test file substitution program 108 merges the two versions of the file. In another embodiment, test file substitution program 108 returns an error to client computing system 104 that multiple versions of the file exist.

Figure 4:
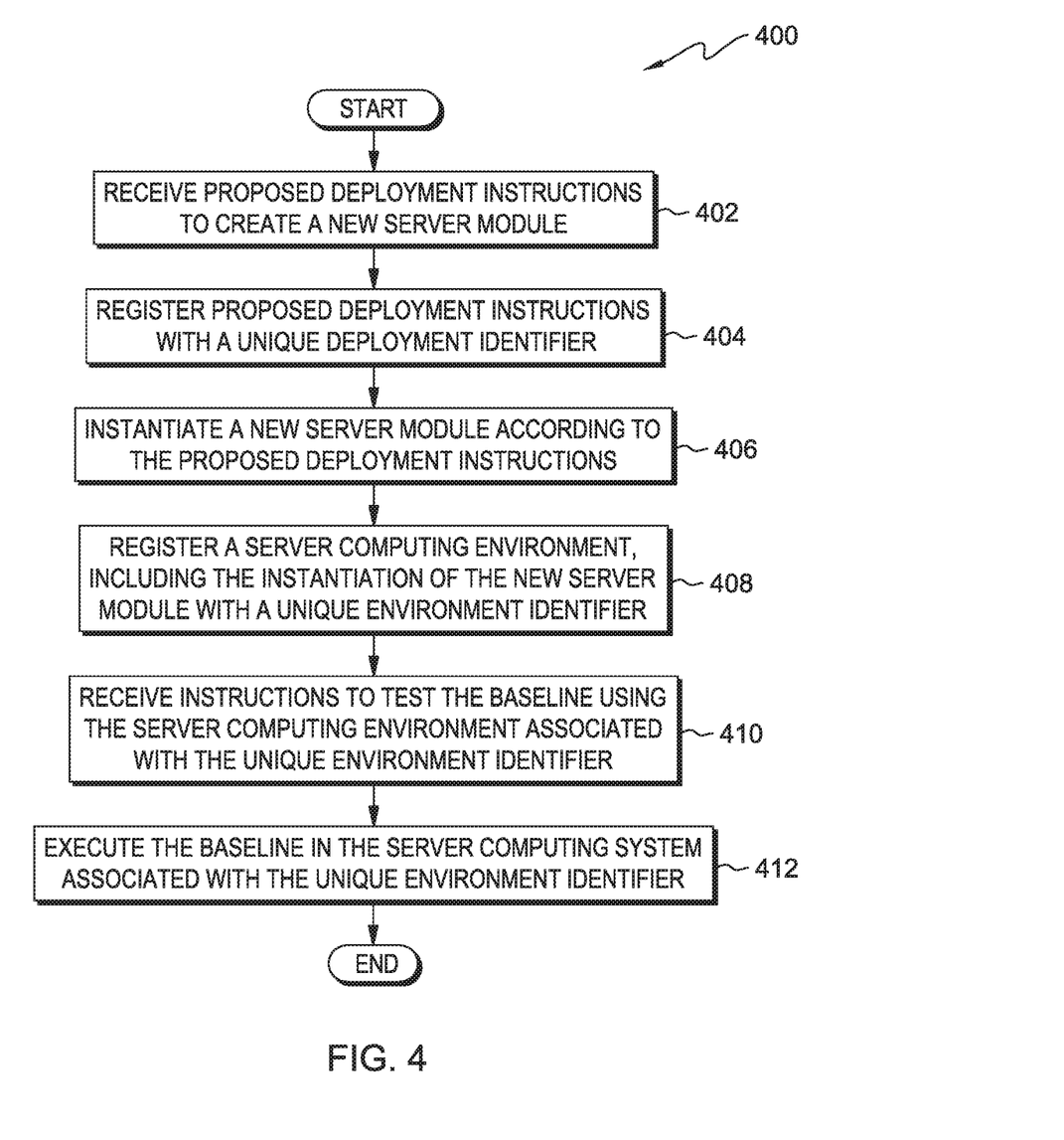
FIG. 4 is a flowchart depicting operational steps of a test-file substitution program for testing modifications to a server computing system, in accordance with an embodiment of the present invention.

FIG. 4 is a flowchart depicting operational steps of a test-file substitution program, generally designated 400, for testing modifications to a server computing system, in accordance with an embodiment of the present invention.

Embodiments of the present invention also enable users to propose and test updates to the server computing system without modifying the server computing system for all users. Server computing system 102 receives proposed deployment instructions to create a new server module (step 402). A server module is an individual component that makes up the complete server computer system. Examples of server modules include application server nodes and databases. A deployment is a set of instructions that instruct server computing system 102 to create a new server module within server computing system 102.

Server computing system 102 registers the proposed deployment instructions with a unique deployment identifier (step 404). For example, registration includes identifying the user by any unique identifier associated with the user, e.g., cookies, http headers, or server login information. Server computing system 102 associates the proposed deployment instructions with the user using the user identifier by, for example, creating a folder in a directory or registry separate from file repository 112 and storing the proposed deployment instructions in that folder.

Server computing system 102 instantiates a new server module according to the proposed deployment instructions (step 406). For example, a user desiring to test an application server node that exists in the baseline on server computing system 102 with a higher memory allocation than normal. Server computing system 102 then creates a new application server node, separate from the application server node in the baseline, with the increased memory allocation.

Server computing system 102 registers a new server computing environment, which includes the instantiation of the new server module with a unique environment identifier (step 408). In this step, server computing system 102 associates a set of server modules with a particular user that includes the proposed deployment instructions submitted by that user. In addition to the new server module, the new server computing environment associated with the environment identifier includes server modules included in the baseline in file repository 112.

Server computing system 102 receives instructions to test the baseline using the server computing environment associated with the unique environment identifier (step 410). In one embodiment, the user sends a request to test the baseline stored in file repository 112 using a server computing environment associated with a unique environment identifier. The server computing environment associated with the unique environment identifier is different from the current server environment of server computing system 102. The different server computing environment includes the instantiation of the new server module from step 406.

Server computing system 102 executes the baseline in the server computing environment associated with the unique environment identifier (step 412). Server computing system 102 executes the baseline stored in file repository 112 in the server computing environment such that when the baseline calls server modules, the modules in the server computing environment having the unique environment identifier are called in place of those server modules included in the baseline.

The embodiment depicted in FIG. 4 enables users to test the server baseline in server computing environments that are different than the current configuration of server computing system 102. Additionally, users who have not registered the unique deployment identifier or environment identifier, or are not grouped with the user who registered the deployment and environment, cannot access the modified server environment and are, therefore, unaffected by the instantiation of the server modules included in the registered deployment.

Figure 5:
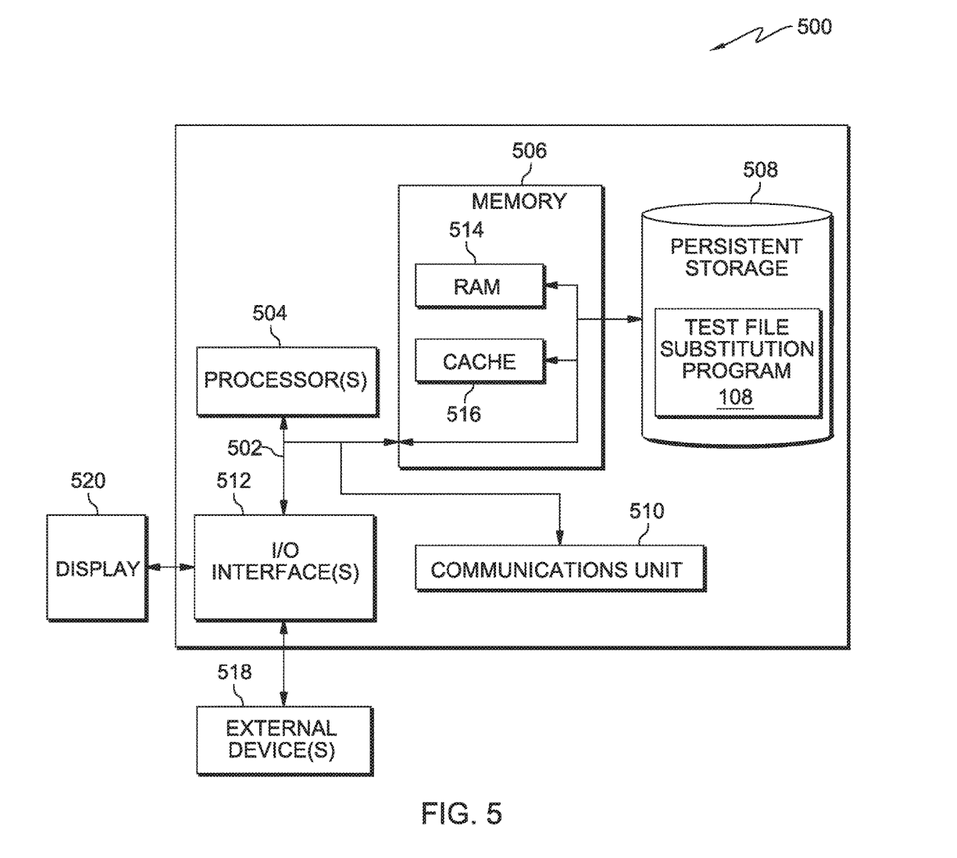
FIG. 5 depicts a block diagram of internal and external components of the server computing system executing the test-file substitution program, in accordance with an embodiment of the present invention.

FIG. 5 depicts a block diagram of components of server computing system 102 and client computing systems 104 and 106, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Server computing system 102 and client computing systems 104 and 106 include communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media. Persistent storage 508: (i) is at least more persistent than a signal in transit; (ii) stores test file substitution program 108 (including its soft logic or data) on a tangible medium (such as magnetic or optical domains); and (iii) is substantially less persistent than permanent storage. Alternatively, data storage may be more persistent or permanent than the type of storage provided by persistent storage 508.

Test file substitution program 108 is stored in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including client computing systems 104 and 106. In these examples, communications unit 510 includes one or more network interface cards. Communications unit 510 may provide communications through the use of either or both physical and wireless communications links. Test file substitution program 108 may be downloaded to persistent storage 508 through communications unit 510.

I/O interface(s) 512 allows for input and output of data with other devices that may be connected to server computer 102 and client computing systems 104 and 106. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., test file substitution program 108, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for testing objects in a client-server environment, the method comprising:

receiving, by one or more computer processors, a plurality of proposed modifications to a baseline set of objects stored in a repository collectively submitted by a plurality of members of a first group of users and a plurality of members of a second group of users, wherein the baseline set of objects includes a set of server modules comprising at least one application server node;

registering, by one or more computer processors, each modification of the plurality of proposed modifications with a user identifier corresponding to the user proposing the modification;

receiving, by one or more computer processors, instructions to test the baseline set of objects with modifications that correspond to the first group of users, wherein receiving includes determining whether any of the users in the first group of users previously registered at least one of the plurality of proposed user modifications to the baseline set of objects by inspecting a unique folder associated with each user in the first group of users to determine whether any users previously submitted the proposed user modifications;

determining, by one or more computer processors, which of the baseline set of objects stored in the repository are subject to the modifications that correspond to the first group of users; and executing, by one or more computer processors, the baseline set of objects and incorporating the modifications that correspond to the first group of users without incorporating modifications that correspond to the second group of users and without committing the plurality of proposed modifications to the baseline set of objects stored in the repository and;

instantiating, by one or more computer processors, an instance of the at least one application server node having at least one modification not made to the at least one application server node of the baseline set of objects, wherein the instance is inaccessible to the second group of users.

2. The method of claim 1, wherein the plurality of proposed modifications comprises one or more of: adding a new file to a set of files contained in the baseline set of objects; modifying a file that already exists in the baseline set of objects; and deleting a file exists in the baseline set of objects.

3. The method of claim 2, wherein determining, by one or more computer processors, which of the baseline set of objects stored in the repository are subject to the plurality of proposed modifications, comprises:

determining, by one or more computer processors, the user identifier and accessing a directory folder in which proposed user modifications submitted by each user of the plurality of members of the first group of users were previously stored.

4. The method of claim 1, wherein the received instructions comprise instructions to test the baseline set of objects in the repository with the plurality of proposed modifications submitted by the plurality of members of the first group.

5. The method of claim 4, further comprising:

determining, by one or more computer processors, a conflict between the plurality of proposed modifications submitted by the plurality of members of the first group; and executing, by one or more computer processors, the set of objects incorporating the plurality of proposed modifications based on specified instructions.

6. The method of claim 5, wherein the specified instructions indicate one of: to favor proposed modifications submitted by a user who requests a test of the baseline set of objects stored in the repository; to favor proposed modifications that are selected by the user who requests the test of the baseline set of objects stored in the repository; and to favor whichever proposed modifications were submitted later in time.

7. A computer program product for testing objects in a client-server environment, the computer program product comprising:

one or more computer-readable storage media and program instructions stored on the one or more computer-readable storage media, the program instructions comprising:

program instructions to receive a plurality of proposed modifications to a baseline set of objects stored in a repository collectively submitted by a plurality of members of a first group of users and a plurality of members of a second group of users, wherein the baseline set of objects includes a set of server modules comprising at least one application server node;

program instructions to register each modification of the plurality of proposed modifications with a user identifier corresponding to the user proposing the modification;

program instructions to receive instructions to test the baseline set of objects with modifications that correspond to the first group of users, wherein receiving includes determining whether any of the users in the first group of users previously registered at least one of the plurality of proposed user modifications to the baseline set of objects by inspecting a unique folder associated with each user in the first group of users to determine whether any users previously submitted the proposed user modifications;

program instructions to determine which of the baseline set of objects stored in the repository are subject to the modifications that correspond to the first group of users;

program instructions to execute the baseline set of objects and incorporating the modifications that correspond to the first group of users without incorporating modifications that correspond to the second group of users and without committing the plurality of proposed modifications to the baseline set of objects stored in the repository; and program instructions to instantiate an instance of the at least one application server node having at least one modification not made to the at least one application server node of the baseline set of objects, wherein the instance is inaccessible to the second group of users.

8. The computer program product of claim 7, wherein the plurality of proposed modifications comprises one or more of: adding a new file to a set of files contained in the baseline set of objects; modifying a file that already exists in the baseline set of objects; and deleting a file exists in the baseline set of objects.

9. The computer program product of claim 8, wherein program instructions to determine which of the baseline set of objects stored in the repository are subject to the plurality of proposed modifications, comprises:

program instructions to determine the user identifier and accessing a directory folder in which proposed user modifications submitted by each user of the plurality of members of the first group of users were previously stored.

10. The computer program product of claim 7, wherein the received instructions comprise instructions to test the baseline set of objects in the repository with the plurality of proposed modifications submitted by the plurality of members of the first group.

11. The computer program product of claim 10, further comprising:

program instructions to determining a conflict between the plurality of proposed modifications submitted by the plurality of members of the first group; and program instructions to execute the set of objects incorporating the plurality of proposed modifications based on specified instructions.

12. The computer program product of claim 11, wherein the specified instructions indicate one of: to favor proposed modifications submitted by a user who requests a test of the baseline set of objects stored in the repository; to favor proposed modifications that are selected by the user who requests the test of the baseline set of objects stored in the repository; and to favor whichever proposed modifications were submitted later in time.

13. A computer system for testing objects in a client-server environment, the computer system comprising:
one or more computer processors;
one or more computer-readable storage media;
program instructions stored on the computer-readable storage media for execution by at least one of the one or more processors, the program instructions comprising:
program instructions to receive a plurality of proposed modifications to a baseline set of objects stored in a repository collectively submitted by a plurality of members of a first group of users and a plurality of members of a second group of users, wherein the baseline set of objects includes a set of server modules comprising at least one application server node;
program instructions to register each modification of the plurality of proposed modifications with a user identifier corresponding to the user proposing the modification;
program instructions to receive instructions to test the baseline set of objects with modifications that correspond to the first group of users, wherein receiving includes determining whether any of the users in the first group of users previously registered at least one of the plurality of proposed user modifications to the baseline set of objects by inspecting a unique folder associated with each user in the first group of users to determine whether any users previously submitted the proposed user modifications;
program instructions to determine which of the baseline set of objects stored in the repository are subject to the modifications that correspond to the first group of users; and
program instructions to execute the baseline set of objects and incorporating the modifications that correspond to the first group of users without incorporating modifications that correspond to the second group of users and without committing the plurality of proposed modifications to the baseline set of objects stored in the repository; and
program instructions to instantiate an instance of the at least one application server node having at least one modification not made to the at least one application server node of the baseline set of objects, wherein the instance is inaccessible to the second group of users.

14. The computer system of claim 13, wherein the plurality of proposed modifications comprises one or more of: adding a new file to a set of files contained in the baseline set of objects; modifying a file that already exists in the baseline set of objects; and deleting a file exists in the baseline set of objects.

15. The computer system of claim 14, wherein program instructions to determine which of the baseline set of objects stored in the repository are subject to the plurality of proposed modifications, comprises:
program instructions to determine the user identifier and accessing a directory folder in which proposed user modifications submitted by each user of the plurality of members of the first group of users were previously stored.

16. The computer system of claim 13, wherein the received instructions comprise instructions to test the baseline set of objects in the repository with the plurality of proposed modifications submitted by the plurality of members of the first group.

17. The computer system of claim 16, further comprising:
program instructions to determining a conflict between the plurality of proposed modifications submitted by the plurality of members of the first group; and
program instructions to execute the set of objects incorporating the plurality of proposed modifications based on specified instructions.

18. The computer system of claim 17, wherein the specified instructions indicate one of: to favor proposed modifications submitted by a user who requests a test of the baseline set of objects stored in the repository; to favor proposed modifications that are selected by the user who requests the test of the baseline set of objects stored in the repository; and to favor whichever proposed modifications were submitted later in time.

* * * * *